July 8, 1969 R. E. JAPHET 3,454,079
INDUCTION UNIT WITH BYPASS MEANS
Filed Dec. 5, 1967

RICHARD E. JAPHET
*INVENTOR.*

BY Daniel H. Bobis
Atty

United States Patent Office 3,454,079
Patented July 8, 1969

1

3,454,079

INDUCTION UNIT WITH BYPASS MEANS

Richard E. Japhet, Livingston, N.J., assignor to Worthington Corporation, Harrison, N.J., a corporation of Delaware Filed Dec. 5, 1967, Ser. No. 688,168
Int. Cl. G05d *15/00;* F28f *13/12;* F24f *3/04*
U.S. Cl. 165—38 10 Claims

ABSTRACT OF THE DISCLOSURE

An air induction circulating unit in which room air is drawn over the coils of a heat exchanger in the unit for heating or cooling prior to being mixed with primary conditioned air for discharge into the room. The unit having a by-pass for diverting air around the heat exchanger which is powered by the pressure differential between the liquid being supplied to the heat exchanger and the liquid leaving the heat exchanger.

*Background*

This invention relates to air induction circulator units and more particularly to controls for these units.

Air induction circulators are well known in the art as is the use of a by-pass damper for by-passing air flow around the induction circulator heat exchanger. In the prior art devices the dampers are either manually operated, as shown in U.S. Patent 2,229,304, or automatically operated, in which case the actuating force may be the plenum air pressure, as in the case of Patent Nos. 3,120,344, 3,123,201 and 3,100,078, or a separate control pressure, as is the case of U.S. Patents 3,139,020 and 2,818,217. Of the automatic control systems there have been two types; those actuated by an outside source of power, which has the disadvantage of requiring connections to outside devices and additional equipment, and those which are operating plenum air pressure. The problem involved in the plenum air actuated device is that only a very limited amount of air pressure is available and the air must be extremely clean to prevent clogging of the actuator mechanisms. Applicant's invention eliminates many of the problems in each of these systems.

*Summary*

Accordingly, it is an object of this invention to provide control means for an induction circulator unit which are powered by the fluid pressure differential available between fluid entering and leaving the circulator heat exchanger.

Another object of this invention is to provide air induction circulator by-pass control means which are positive acting and not susceptible to failures due to dirt entrained in the operating fluid.

Another object of this invention is to provide an air induction circulator by-pass control which is not powered by an outside source of energy and yet is still positive acting.

Still, another object of this invention is to provide a by-pass control for an air induction circulator unit which does not require a power source from outside of the circulator unit.

These objects are achieved in the present invention by providing a heat exchanger by-pass control responsive to the temperature of the air entering the unit and which is powered by the pressure differential of the fluid entering and leaving the heat exchanger.

2

*Drawings*

*Description*

Figure 1:
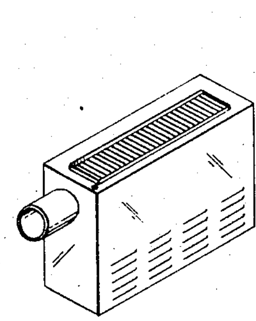
FIGURE 1 is a perspective view of an induction circulator.
Figure 2:
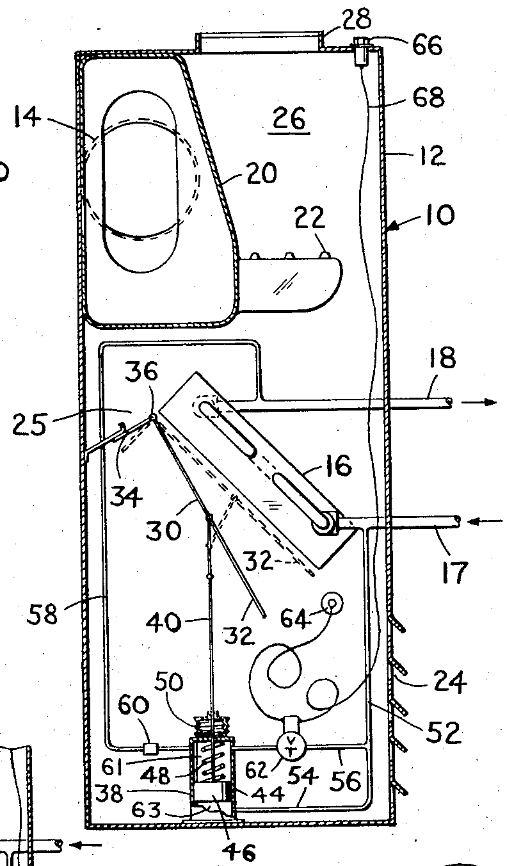
FIGURE 2 is an end view with the side panel removed of an induction circulator embodying the present invention.

Referring particularly to FIGURE 2, there is shown an induction circulator 10 including a casing 12 to which is connected duct 14 for the delivery of primary air under pressure to the unit from a central multi-room air conditioning system (not shown). Heat exchanger 16 is disposed in casing 12 and there are tubes 17 and 18 connected thereto for delivering and removing heat exchange fluid from the heat exchanger. A plenum 20 is located in the casing to receive primary air from the duct 14 and has discharge means 22 attached thereto. The casing includes an air inlet 24 at the bottom of the unit and a discharge opening 28 at the top of the unit.

The basic operation of an air induction circulator unit is well known in the art and will only be briefly described herein. Primary air is delivered by duct 14 into the plenum 20 to be discharged from the discharge means 22. Secondary air induced by the discharge of the primary air passes through the front openings 24 of the casing 12 to be drawn through either heat exchanger 16 and/or bypass opening 25 where it passes to the mixing chamber 26 in which it mixes with primary air and then discharged through the outlet opening 28 into the area to be conditioned.

Damper 30 is disposed in casing 12 and has a heat exchanger baffle 32 and a bypass baffle 34 and can be selectively positioned whereby secondary air is allowed to pass through either, or both the bypass opening 25 and the heat exchanger 16. Damper 30 is pivotally connected to the casing 12 so as to rotate about the point 36.

The position of damper 30 is controlled by a damper actuating motor 38 which is connected to the damper by a linkage 40.

The damper actuator motor includes a cylinder 44 encasing a piston 46 which is connected to the linkage 40. A spring 48 urges the piston 46 and damper 30 in a downward direction. A diaphragm 50 is attached to the cylinder housing and to the linkage 40 to prevent leakage of actuating fluid from the cylinder assembly. A line 52, having two branches 54 and 56, connects the chamber on each side of the piston to the heat exchanger inlet line 17. Line 58, having a restricted orifice 60 therein, connects the chamber 61 at the top of the piston to the heat exchanger outlet line. A throttling valve assembly 62 is located in line 56 for controlling the flow into the chamber above the piston 46. The valve 62 is responsive to a temperature sensing element 64 to regulate the flow as described hereinbelow.

The valve assembly 62 is of the type sold by American Radiator and Standard Sanitary Corporation under the trade name of "Selectaflow" which will control heating or cooling subject to the temperature of the water being supplied. If hot water is supplied, as will be the case during the winter, the valve controls heating and if cold water is supplied, as will be the case during the summer, the valve controls cooling. A thermostatic element in the valve assembly constantly senses supply water temperature and automatically changes over from heating to cooling or vice versa depending on the supply water temperature. A temperature selection element 66 is mounted on the upper surface of the induction unit and is connected to the valve by a capillary to 68. This selection device is used to set the required temperature of the room.

*Operation*

The operation of the by-pass control shown in FIGURE 2 will first be described for a heating cycle during the winter when hot water is supplied to the heat exchanger inlet line 17 discharged through outlet line 18 after passing through the heat exchanger coil. The underside of piston 46 is continuously connected to the heat exchanger inlet line via line 54, while the topside of piston 46 is connected to the outlet line via line 58 and to the heat exchanger inlet line via line 56 which includes the throttle valve 62.

It will be apparent that the force tending to push the piston up is simply the supply pressure multiplied by the area of the piston and the force tending to push the piston down is the force exerted by spring 48 plus a hydraulic force proportional to the pressure in the top chamber. This pressure will be some value between the inlet and the outlet pressure of the heat exchanger, depending on the throttle valve position. When the throttle valve is wide-open the pressure on the top of the piston will be the same as the pressure on the bottom of the piston and will balance so that the spring force will push the piston downward to close the by-pass and direct all of the incoming air into the heat exchanger.

On the other hand, when the throttle valve is completely closed the pressure on top of the piston will be equal to the outlet pressure which is between 2 and 3 p.s.i. less than the inlet pressure, while pressure on the bottom surface of the piston will be equal to the inlet pressure. In this case the pressure acting on the bottom of the piston will overcome the combined spring force and hydraulic pressure on top of the piston and the damper will be forced to the closed position in which all of the air passes through the by-pass without going over the heat exchanger coils. Between these two extremes there will be an infinite number of damper positions with varying degrees of by-pass, depending on the throttling valve position.

During winter operation when there is hot fluid being supplied to the heat exchanger the throttling valve will open when the temperature of the air entering the induction unit decreases below the preset limit as determined by the setting of the actuator 66. This will cause the pressure on top of the piston to increase forcing the piston down and increasing the percentage of the air flow which passes over the heat exchanger. The additional heating of this air will cause the temperature in the room to increase until the temperature entering the induction unit is equal to the temperature set by the control 66. In this manner, the control will continually regulate the position of the damper baffle 30 to maintain a preset room temperature.

During summer operation the heat exchanger is being supplied with cold liquid and the throttling valve will automatically switch over so that when the temperature of the air entering the induction unit is above the temperature set by the control switch 66 the throttling valve will open and cause the damper to open and allow additional flow through the heat exchanger, thereby cooling the room until the temperature of the air entering the induction unit decreases to the temperature set by the control 66. The operation of the piston will be identical with the operation during the winter with the single difference being the reverse operation of the throttling valve 62.

Figure 3:
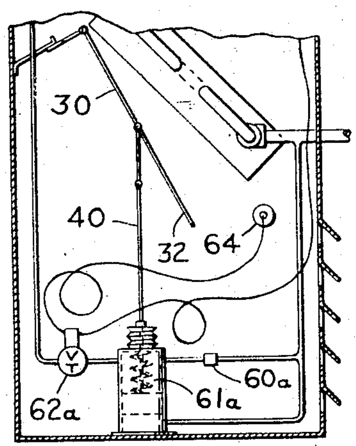
FIGURE 3 is a partial end view of an induction unit embodying a modified form of the present invention.

In the embodiment of the invention shown in FIGURE 3, the throttling valve 62*a* is located in the line between the heat exchanger outlet and the chamber 61*a* at the top of the piston while the orifice 60*a* is located in the line between the heat exchanger inlet and the top of the piston. The position of the orifice and the valve are simply switched. The operation of the control will be similar except that opening of the throttle valve will cause the pressure on the top of the piston to decrease rather than increase and will cause the piston to move upward in a direction to close the damper and bypass more air around the heat exchanger. In this embodiment then, the valve must be set for winter operation so that the valve will close, causing the piston to go down, when the temperature of the air entering the induction unit falls below the preset value. During summer operation the throttle valve will switch automatically with a shift in heat exchanger fluid temperature so that it will close and force the piston to move downward when the temperature of the air entering the induction unit is above the predetermined limit.

Figure 4:
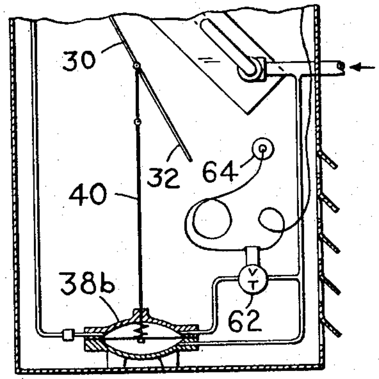
FIGURE 4 is a partial end view of an induction unit embodying a modified form of the present invention.

The embodiment shown in FIGURE 4 is similar to that shown in FIGURE 2 with the only difference being the substitution of a diaphragm motor 38*b* for the piston cylinder motor shown in FIGURE 2. The choice of a diaphragm motor or a piston cylinder motor would depend on the particular design characteristics of the actual induction unit in which this invention would be embodied.

Although not shown, this invention could be embodied in a unit including a differential area piston in which a lower pressure acting on the large area side of the piston would be balanced by a higher pressure acting on the small area side of the piston. The pressure on one side of the piston would be regulated as described above to control the piston position. This would eliminate the necessity of a spring to bias the piston in one direction.

It will be understood that this invention is not to be limited to the specific construction or arrangement of parts shown but that they may be widely modified within the invention defined by the claims.

Although this invention is shown embodied in an induction circulator, it can be utilized in other types of air handling units. It could be used in a conventional fan and coil air handling unit to provide control without having to vary the fan speed. In this embodiment the bypass would be used to control the percentage of the total air flow which will actually pass through the heat exchanger.

What is claimed is:

1. An air conditioning apparatus comprising:

(a) a casing having an inlet and an outlet;

(b) means for inducing air flow through the casing from the inlet to the outlet;

(c) a heat exchanger in the casing for conditioning air passing therethrough;

(d) heat exchange inlet and outlet lines connected to the heat exchanger for circulating heat exchanger liquid therethrough;

(e) a bypass damper in the casing for regulating the quantity of air passing through or bypassing the heat exchanger;

(f) a hydraulic motor actuated by the pressure of the liquid passing through the heat exchanger and connected to the damper to control the damper position; and (g) hydraulic motor control means responsive to the temperature of the air passing through the casing.

2. The air conditioning apparatus as defined in claim 1 wherein, the hydraulic motor and control includes; pressure responsive member connected to the bypass lamper, a chamber on one side of the pressure responsive member communicating with one of the heat exchanger liquid lines, and a second chamber on the other side of the pressure responsive member having lines connected to the heat exchanger inlet and outlet lines, one of the second chamber lines having a restriction therein and the other having a control valve therein whereby the pressure in the second chamber may be regulated at any valve between the heat exchanger inlet and outlet pressures.

3. The air conditioning apparatus as defined in claim 2 wherein, the pressure responsive element is a piston moving in a closed cylinder.

4. An induction circulator comprising:

(a) a casing;
(b) a plenum in the casing having a discharge means arranged to induce air flow through the casing;
(c) a heat exchanger in the casing;
(d) heat exchange inlet and outlet lines connected to the heat exchanger for circulating heat exchange liquid therethrough;
(e) a bypass passage adjacent the heat exchanger;
(f) a damper in the casing adapted to be selectively positioned to regulate the induced flow of air through either or both the bypass passage and the heat exchanger;
(g) pressure responsive actuating means connected to the damper and operated by the pressure of the heat exchange liquid; and
(h) means for controlling the actuating means in response to the temperature of the air passing through the casing.

5. The air induction circulator as defined in claim 4 wherein, the pressure responsive actuating means includes a pressure responsive member connected to the damper having pressure chambers acting on either side of the member, the chamber on one side communicating with one of the heat exchanger liquid lines to provide a relatively constant pressure on the pressure responsive member and the second chamber having lines connected to both the inlet and outlet sides of the heat exchanger, one of the second chamber lines having a fixed restriction therein and the other having a control valve therein.

6. The induction circulator as defined in claim 5 wherein, the pressure responsive element is a piston moving in the cylinder.

7. The induction circulator of claim 5 wherein, the control valve is movable responsive to the difference between the temperature of the air passing through the circulator and a predetermined temperature setting.

8. The induction circulator of claim 6 wherein, the control valve is movable responsive to the difference between the temperature of the air passing through the circulator and a predetermined temperature setting.

9. The induction circulator of claim 7 wherein, the operation of the control valve is automatically reversible in response to a change in the temperature of the heat exchange fluid from hot to cold and vice versa.

10. An air circulator for heating or cooling an air stream of the type having a heat exchanger being supplied with a heat exchange liquid, a bypass damper for controlling the quantity of air flowing through the heat exchanger and a damper position control responsive to a signal indicative of the temperature difference between air passing through the heat exchanger and a predetermined temperature, wherein the improvement comprises a pressure responsive damper position control which is actuated by the differential pressure between the liquid entering and leaving the heat exchanger.

References Cited

UNITED STATES PATENTS

| | | | |
|---|---|---|---|
| 3,047,274 | 7/1962 | Wilson | 165—39 |
| 3,208,508 | 9/1965 | Bryans et al. | 165—123 |
| 3,213,928 | 10/1965 | Anderson et al. | 165—123 |

ROBERT A. O'LEARY, *Primary Examiner.*

CHARLES SUKALO, *Assistant Examiner.*

U.S. Cl. X.R.

165—123